United States Patent [19]
Seitter et al.

[11] Patent Number: 5,689,061
[45] Date of Patent: Nov. 18, 1997

[54] LEAK DETECTION METHOD AND SYSTEM FOR PRODUCT LINES IN FUEL DISPENSING SYSTEMS

[75] Inventors: Larry E. Seitter; Jerry W. Bradshaw, both of Olathe, Kans.

[73] Assignee: Marley Pump, Overland Park, Kans.

[21] Appl. No.: 698,135

[22] Filed: Aug. 15, 1996

[51] Int. Cl.⁶ ............................................. G01M 3/28
[52] U.S. Cl. ............................................. 73/40.5 R
[58] Field of Search ...................... 73/40.5 R, 49.2; 364/558; 340/605

[56] References Cited

U.S. PATENT DOCUMENTS

| | | | |
|---|---|---|---|
| 3,966,088 | 6/1976 | Reynolds | 73/40.5 R |
| 4,404,842 | 9/1983 | Mooney | 73/40.5 R |
| 4,876,530 | 10/1989 | Hill et al. | 73/49.2 |
| 5,317,899 | 6/1994 | Hutchinson et al. | 73/40.5 R |
| 5,333,115 | 7/1994 | Clouser et al. | 73/40.5 R |
| 5,372,032 | 12/1994 | Filippi et al. | 73/40.5 R |
| 5,408,420 | 4/1995 | Slocum et al. | 73/40.5 R |
| 5,557,965 | 9/1996 | Fiechtner | 73/40.5 R X |

*Primary Examiner*—Michael Brock
*Attorney, Agent, or Firm*—Kokjer, Kircher, Bowman & Johnson

[57] ABSTRACT

A leak detection system which operates at relatively high pressures and senses relatively large pressure drops to monitor for leakage in fuel product lines such as those used for dispensing of fuel at gasoline service stations. Leakage tests of various degrees of precision are carried out, and the possible effects of thermally induced expansion and contraction are taken into account. The system also checks for faulty pressure sensors and dry tank conditions. Leak indications are confirmed by a time delay and retesting before a leak alarm is given.

10 Claims, 9 Drawing Sheets

LEAK DETECTION METHOD AND SYSTEM FOR PRODUCT LINES IN FUEL DISPENSING SYSTEMS

FIELD OF THE INVENTION

This invention relates generally to the detection of leakage from piping systems and more particularly to a method and apparatus for detecting the presence of a leak in the product line of a fuel dispensing installation of the type commonly used at gasoline service stations.

BACKGROUND OF THE INVENTION

The fuel dispensing systems used at gasoline service stations typically include underground storage tanks, pedestal dispensers, product lines leading from the tanks to the dispensers, and a pump for each tank for pumping the fuel to the dispensers. A dispensing nozzle at the pedestal has a switch which is operated manually to open a solenoid valve permitting the fuel to be dispensed through the nozzle.

The pump assembly normally has a check valve and a relief valve which are used to relieve the pumping pressure in the product line to a "relief" pressure at the end of a pumping cycle. The pumping pressure during operation of the pump may be in the range of 30–35 psi, while the relief pressure is typically about 12–13 psi.

Fuel leakage into the soil has been of increasing concern in recent years, and environmental regulations have been promulgated to deal with this problem. Standard leak rate tests have been developed and are carried out by leak detection devices that are required by federal and state regulations to detect the leakage from the product lines of fuel dispensing systems.

One test that is performed is known as an hourly test that checks for large leaks of three gallons per hour or more. A monthly test checks for leaks of 0.2 gallon per hour or more. Finally, a test known as an annual test checks for leaks at rates as low as 0.1 gallon per hour.

Various types of leak detection systems have been proposed for performing the leak tests. U.S. Pat. No. 4,876,530 to Hill et al. discloses one type of system that has met with success, primarily because it makes use of techniques that can distinguish with a reasonable degree of accuracy between a pressure drop caused by thermal contraction and a leak. However, this system operates at relatively low pressures and pressure differentials (a pressure drop from 10 psi to 5 psi is typically involved), which require longer test times. The Hill et al. system also requires a reservoir in order to supply make up volume loss due to thermal contractions. This adds to the cost of the system.

U.S. Pat. No. 5,372,032 to Filippi et al. discloses another leak detection system. The scheme used in this system involves monitoring the product line for a preselected pressure drop during a time period that depends on the precision of the test that is being conducted. If the pressure drop occurs before the test period elapses, a leak is declared. The effects of thermal expansion/contraction are handled by waiting 3 hours before initiating a test. Such a time delay is undesirable.

SUMMARY OF THE INVENTION

The present invention represents an improvement in the cost and reliability of leak detection in pipes of the type used in fuel dispensing systems. In particular, the present invention operates at relatively high pressures and with relatively large pressure differentials, both of which reduce the time required to detect true leaks. The use of relatively high pressures also eliminates the need for accumulators and other mechanical devices, thus reducing cost. Dynamic techniques for distinguishing a leak from a thermal contraction are also used, unlike in the Filippi et al. system. The effects of thermal expansion are taken into account by changing the criteria which must be met in order to indicate a leak when thermal expansion is present. The system confirms that a leak is in fact present by checking to make certain that a pressure change is not caused by a transient condition such as an aberrational pressure fluctuation. Defects in the equipment are also monitored.

In accordance with the invention, increasingly precise tests are made which are commonly referred to as hourly, monthly and annual tests. Under normal conditions, the system checks for a 15 psi pressure drop from the approximately 25 psi "relief" pressure at which the product line is maintained following pump deactivation. If such a drop does not occur within a preselected time period (such as 125 seconds), an hourly test is passed. Then, the system can pass a monthly test if there is no 15 psi pressure drop within a longer time (such as 1200 seconds), and an annual test if there is no 15 psi pressure drop within a still longer time period (such as 2000 seconds).

If any of these tests is not passed, the reason could be a leak or thermally induced contraction of liquid in the product line. If an hourly test is not passed, the system performs a monthly test using a different technique that is based on the principle that successive pressure drops require progressively longer durations if they are caused by thermal contraction but will remain essentially equal if due to a leak. If this monthly test is passed, the system proceeds to an annual test which is based on the same principle but uses different criteria because of its greater precision.

If an hourly test is passed but either a monthly or annual test is thereafter not passed, a monthly test is attempted using the same principle (but with different criteria) to attempt to distinguish a leak from thermal contraction. If this monthly test is passed, the system proceeds with an annual test making use of the same principle but with still different criteria for comparing the times between successive 15 psi pressure drops.

If thermal expansion is present, special measures are taken. Relatively long time periods (2 hours in the case of a monthly test and 4 hours in the case of an annual test) are used to check for a smaller pressure drop (5 psi, for example). This compensates for the effects of thermal expansion and prevents these effects from disguising a leak. At the same time, a pressure drop within the prescribed period causes the system to make an ordinary test in order to assure or confirm that it is actually due to a leak and not caused by something else such as a thermal contraction.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
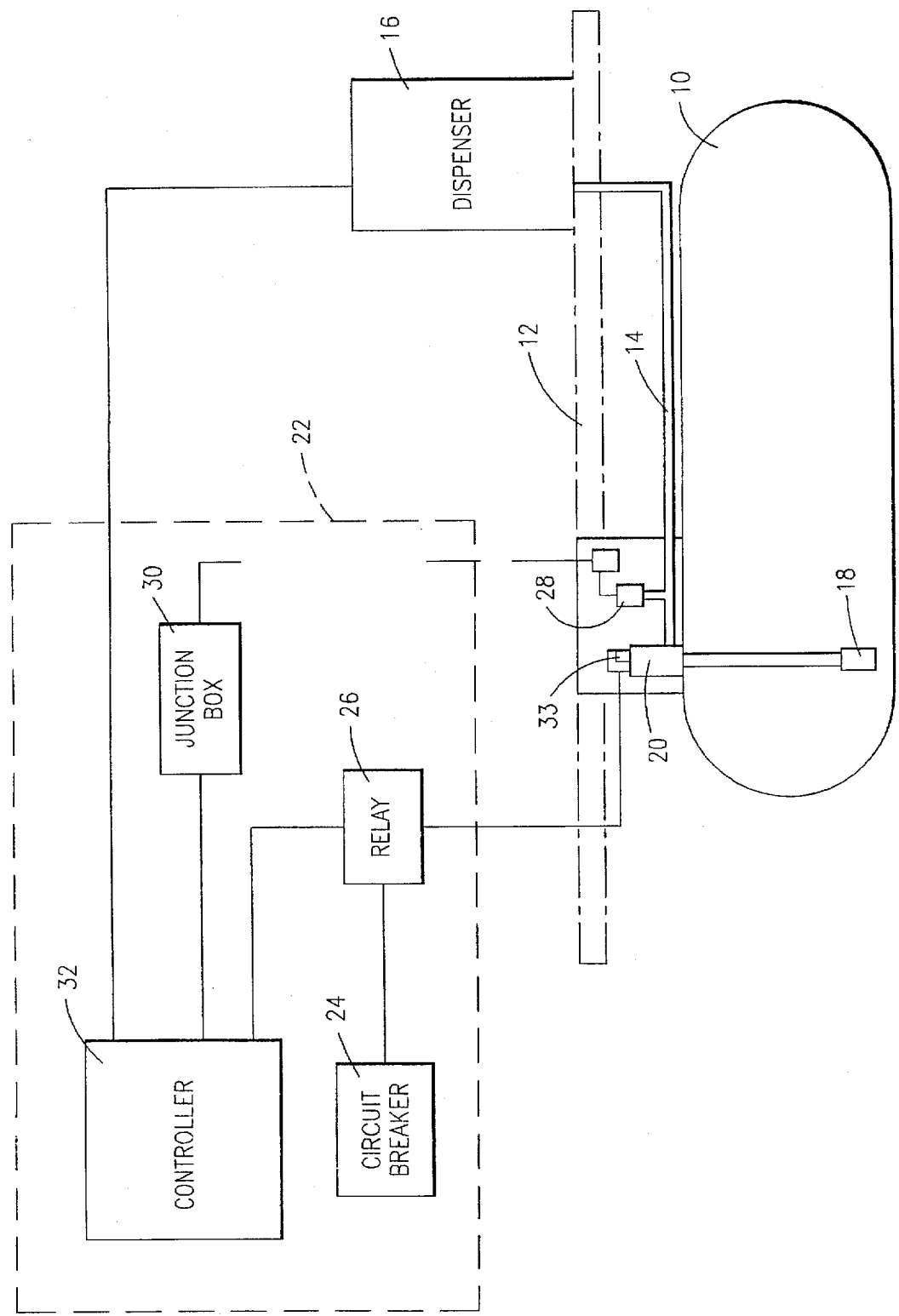
FIG. 1 is a diagrammatic view of a fuel storage and dispensing system which is equipped with a high pressure leak detecting system constructed in accordance with a preferred embodiment of the present invention.

Referring now to the drawings in more detail and initially to FIG. 1, the present invention is directed to a high pressure leak detection system which senses leaks in the product line of a fuel dispensing system of the type commonly found in gasoline service stations. The fuel is stored in a large underground tank 10 which is buried beneath a slab 12 located at ground level. A product line 14 extends from the underground tank 10 to a dispenser 16 which may be a pedestal type unit mounted on the slab 12. A submersible pump 18 operates to pump the fuel from the tank 10 through the product line 14 to the dispenser 16. The pump 18 is driven by a conventional electric motor. A pump discharge head 20 is located outside of the storage tank 10 and receives the liquid fuel from the pump and delivers it to the product line 14. Normally, the discharge head 20 and pump 18 are accessible through an access well (not shown) that may be covered by a suitable cover.

The electrical controls for the pump 18 are normally located within the service station building 22. These controls include a main circuit breaker panel 24 which receives and distributes AC power. A pump motor relay 26 is supplied with electrical power from the panel 24 and is electrically connected with the pump 18. The controller 32 interprets signals from the dispenser 16 and turns the pump relay on or off accordingly.

An adjustable functional element 33 is provided to allow setting relief pressure at a value within about 1 or 2 psi of pump run pressure.

A pressure transducer 28 is arranged to sense the pressure in the product line 14. The transducer provides an electrical output signal which is proportional to the pressure that is sensed, and this signal is provided through a junction box 30 to a microprocessor based controller 32. The controller 32 is connected to control the relay 26 in order to control the activation and deactivation of the pump 18. The controller 32 is also connected with the dispenser 16 in order to sense whether the dispenser handle is up (when a customer is requesting the dispensing of fuel) or down.

Figure 2:
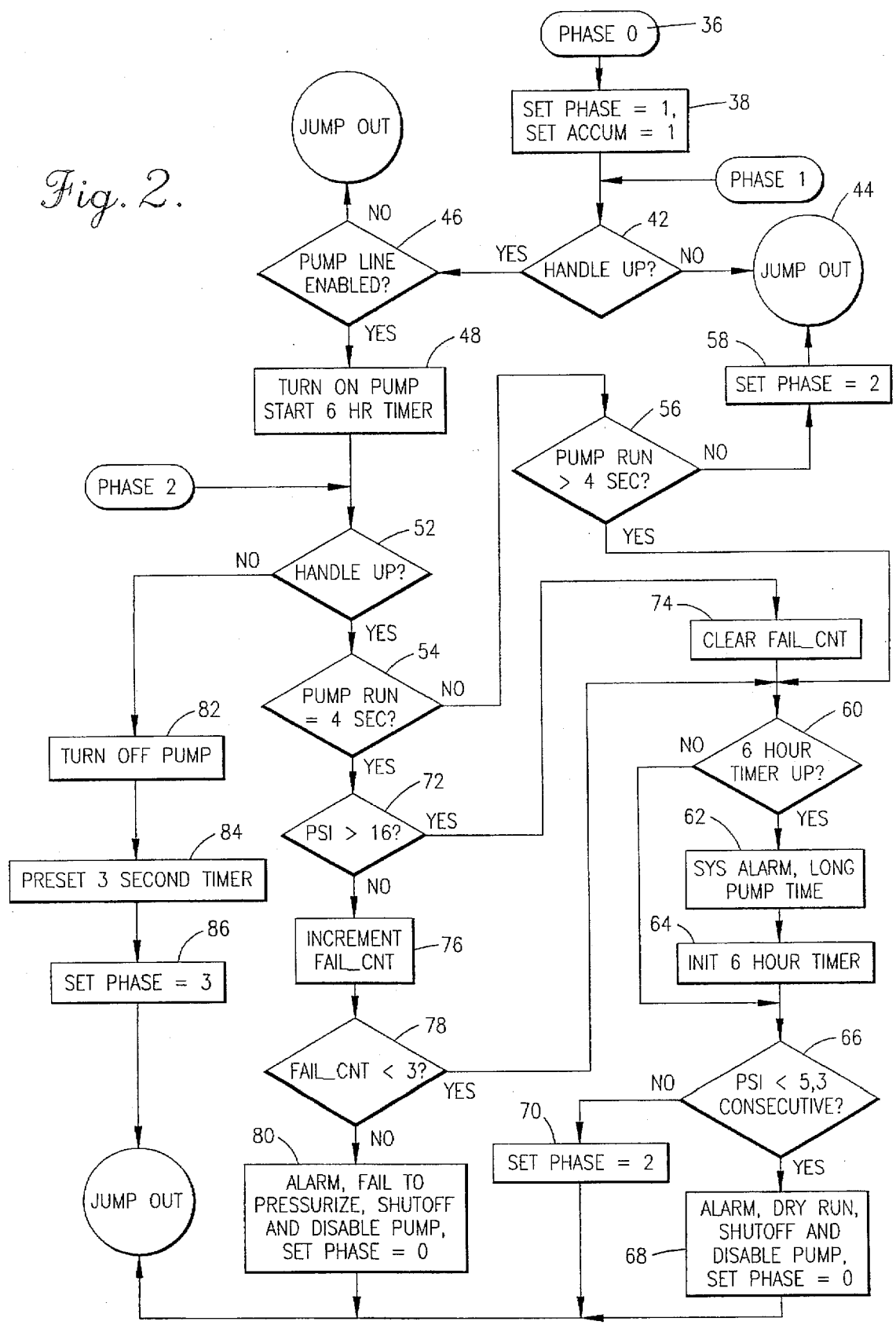
FIGS. 2–9 are flow charts for the programming of the leak detection system.

The flow chart which is depicted in FIG. 2 relates to the initial phases of the software routine that senses product line leaks and other conditions of the dispensing system in accordance with the present invention. Phase 0 is the starting point of the software routine and is initiated in block 36 when a customer requests the dispensing of fuel. In block 38, phase 1 is set and the accumulation number (decay cycle counter) is initialized to a setting of one. Phase 1 is then entered. Block 42 detects whether the handle is up to indicate a customer request for fuel. If it is not, the program loops, waiting for a customer to request use of the pump.

If the pump handle is up, block 46 is entered. There, the program loops if the pump product line is in a disabled condition due to a previous alarm. If the pump line is enabled (no previous alarm), the pump is actuated and a six hour timer is initiated in block 48. Phase 2 is then entered, and the pump handle condition is checked again in block 52. If fuel is being dispensed, the program waits 4 seconds allowing full line pressure to be achieved, then tests the line pressure in block 72 for normal pressurization. If the pressure is above 16 psi, the failure counter used to keep track of consecutive repressurization fails, is cleared in block 74 before block 60 is entered. If the pressure does not exceed 16 psi, the failure counter is incremented in block 76 and block 78 is entered to check the state of the failure counter. If the failure counter value is less than three, block 60 is entered. If the failure count is equal to three, block 80 provides a fail to pressurize alarm, shuts off and disables the pump, and returns to phase 0. If the pump has been running for more than four seconds, block 60 is entered to determine if the pump has operated continuously for six hours. If the six hour timer has expired, indicating an excessive pump run period, block 62 is entered to provide an alarm indication of an excessively long pump run time so that corrective action can be taken. The six hour timer is then initiated again in block 64 before block 66 is entered. If the timer has not expired, a test for dry tank is conducted starting in block 66.

Block 66 makes a determination as to whether there have been three consecutive pressure readings in the product line of less than 5 psi. If there have been, a dry product tank is indicated and block 68 provides a dry run alarm condition, shuts off and disables the pump to avoid burning out its motor, and sets the phase equal to 0. If there have not been three consecutive pressure readings less than 5 psi in the product line, the program continues in phase 2.

If it was determined in block 52 that the handle is not up, a leak test is made. In block 82, the pump is turned off. A three second timer is initiated in block 84 and the program continues in Phase 3.

Figure 4:
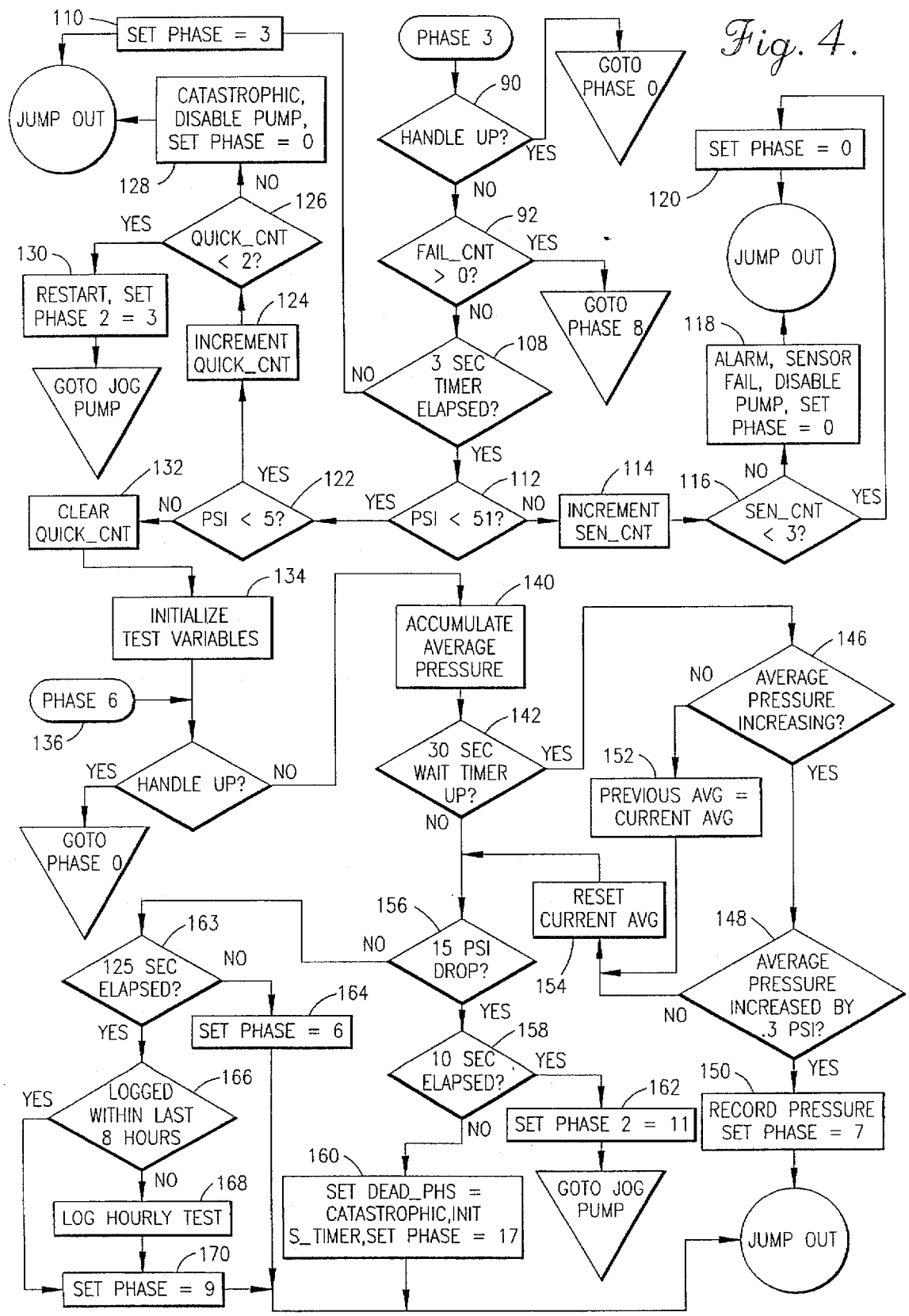

Referring now to FIG. 4, the phase 3 routine includes an initial check as to whether a request for dispensing fuel is made. If it is determined in block 90 that the handle is up indicating a customer request for dispensing of fuel, the program goes to phase 0. If dispensing is not taking place, a check of the current value of the pressurization failure counter is made in block 92. If the fail count value is greater than 0, indicating that there has been at least one failure to reach 16 psi in the product line, the program goes to phase 8 which is essentially a waiting routine.

Referring to FIG. 5, phase 8 again makes the handle up query in block 96. If a request for dispensing of fuel is made, the program goes to phase 0. If the handle is not up, a check is made in block 98 to determine if the current product line pressure has dropped by more than 15 psi from the initial pressure reading. If it has not, block 100 is entered and a check is made as to whether the product line pressure is less than 5 psi. If it is not, the program loops in phase 8. If the pressure has dropped by 15 psi as determined in block 98 or is less than 5 psi as determined in block 100, a new test is initiated in block 104. Then, the program goes to the jog pump routine. As will be explained more fully, the jog pump routine is used to turn on the pump in order to raise the product line pressure when it has dropped to an unduly low level, or an intermediate test cycle has ended.

Referring again to FIG. 4, block 108 is entered in phase 3 if the fail count state is equal to 0. If the three second timer has not elapsed, the phase is set to 3 in block 110 and the program continues in phase 3 until the three second timer has expired. When it has expired, block 112 is entered to make certain that the product line pressure does not exceed 51 psi. If it does, the sensor failure count is incremented in block 114 and a check is made in block 116 to determine whether the sensor failure count is less than three. If it is not, there is an indication that the pressure transducer has failed, and block 118 is entered to generate a sensor fail alarm, disable the pump and set the phase equal to 0. If the sensor count state is less than three, the phase is set to 0 in block 120, aborting the leak test.

Under normal conditions, the pressure in the product line is less than 51 psi, and a check is then made in block 122 to make certain that the pressure exceeds 5 psi as it should. If the pressure is less than 5 psi, a counter is incremented in block 124 and the value of the counter is checked in block 126. If the count is equal to two, block 128 is entered to provide a catastrophic alarm signal, disable the pump and set the phase equal to 0. If the count value is determined to be less than 2 in block 126, the test is restarted.

If it is determined in block 122 that the product line pressure is 5 psi or greater, the counter is cleared in block 132 and a number of starting values are initialized in block 134 before an actual leak test is initiated in phase 6.

Phase 6 begins at block 136. First, the handle status is checked and the program reverts to phase 0 if the handle is up. If it is not, block 140 is entered. There, an average pressure reading is accumulated. Then, a check is made in block 142 to determine whether the 30 second wait timer has expired. If the timer has not expired, the program continues in block 156. If it has expired, the average pressure is tested in block 144 to determine if it is increasing. If the current average psi is greater than the previous average psi (block 146), there is the possibility of a thermal expansion taking place in the product line, and block 148 is entered. In block 148, a check is made as to whether the current 30 second average psi is 0.3 psi greater than the previous 30 second coverage. If that condition is satisfied, the system interprets it as being a thermal expansion in the product line, and block 150 is entered to set the phase equal to 7. As will be described, phase 7 is used to check for leaks in the presence of a condition involving thermal expansion.

If the current average psi is less than the previous average psi reading, block 152 is entered from block 146 and the current average psi reading is set to be the previous reading before block 154 is entered, where the current average psi is reset, and the program continues in block 156.

Block 156 checks for a pressure drop of 15 psi from the starting pressure recorded in block 134. If there has been a 15 psi pressure drop, a check is made in block 158 to determine whether 10 seconds has elapsed. If not, a catastrophic leak is suspected, and block 160 is entered to set up an additional test in phase 17. If more than 10 seconds have elapsed on the standard timer, block 162 is entered to set phase 2 equal to 11 and the system then goes to the jog pump routine, and continues the test in phase 11.

If there has not been a 15 psi pressure drop, a check is made in block 163 to determine whether 125 seconds have elapsed. If not, the program continues looping through phase 6. If the standard timer indicates that more than 125 seconds has elapsed, the system has passed what is referred to in the industry as an "hourly" test, meaning that if there is leakage it is less than 3 gallons per hour. If it is determined in block 166 that there has not been an hourly test logged within the last 8 hours, an hourly test is logged in block 168. The program then continues in phase 9. If an hourly test has been logged within 8 hours, another will not be logged.

Figure 3:
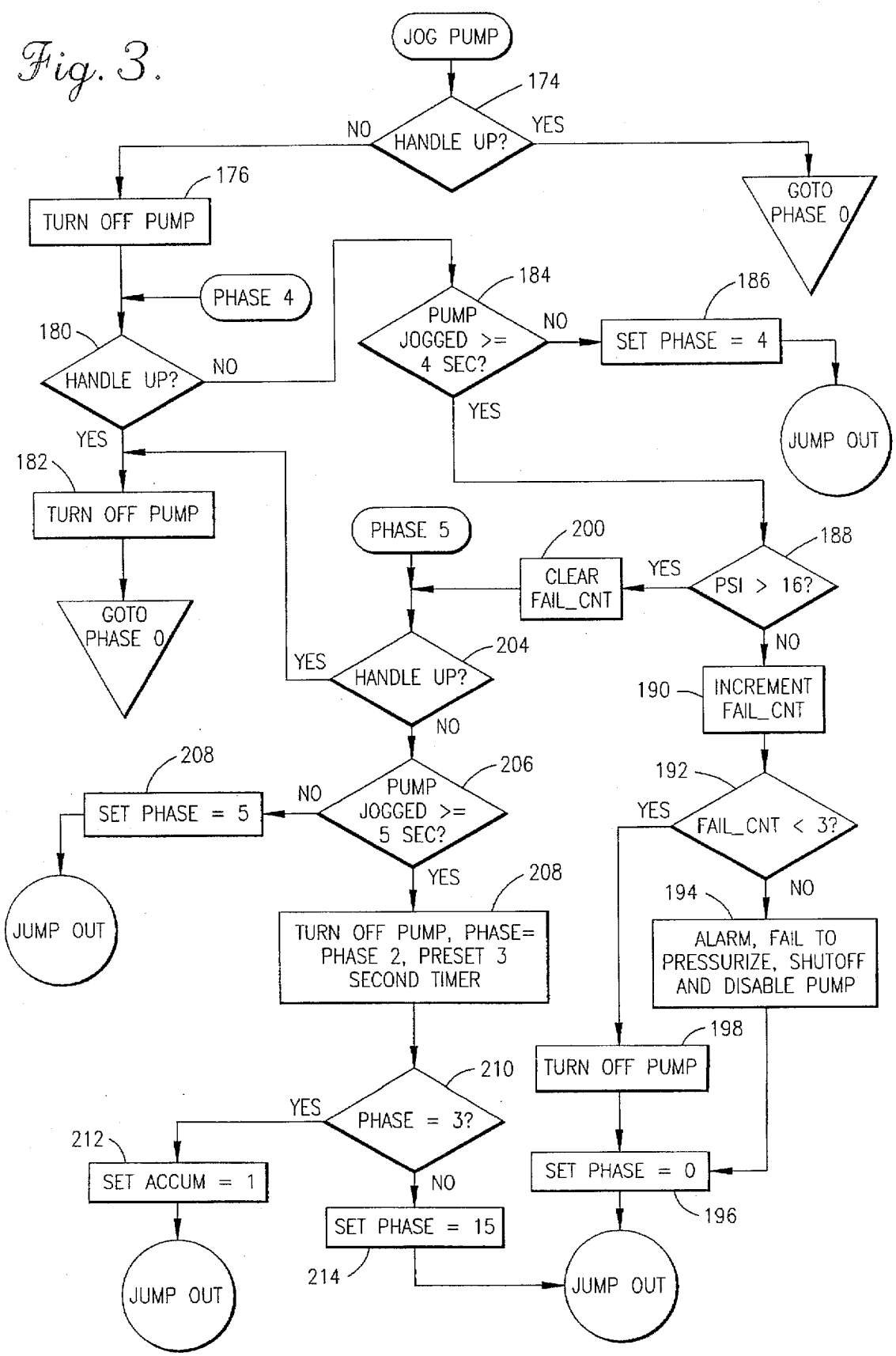

FIG. 3 depicts the jog pump routine. The program goes to phase 0 if the handle is up as determined in block 174. If the handle is not up, the pump is activated in block 176 and phase 4 is then entered. If it is determined in block 180 that the handle is up, the pump is turned off in block 182 and the program goes to phase 0.

If the handle is not up, block 184 will loop for 4 seconds. After the pump has been jogged for 4 seconds, a check is made in block 188 as to whether the product line pressure exceeds 16. If it does not, the fail counter is incremented in block 190. A check is made in block 192 of the fail count value. If it reaches 3, block 194 is entered to provide a failure to pressurize alarm and to shut off and disable the pump before setting the phase equal to 0 in block 196. If the fail count value is less than 3, the pump is turned off in block 198 and further testing is aborted.

If the check made in block 188 indicates that the pressure exceeds 16 psi indicating a normal condition, the fail counter is cleared in block 200 and phase 5 is entered. If block 204 indicates that the handle is up, block 182 is entered. If the handle is not up, a check is made in block 206 of the pump jog time. If the pump has not been jogged for 5 seconds, the program loops in phase 5. When the pump jog time reaches 5 seconds, the pump is turned off in block 208, the phase is set at phase 2, and the three second timer is preset.

Block 210 checks for the current phase to determine whether the system is currently operating in phase 3. It is noted that the phase is set equal to phase 2 in block 208. However, many of the routines set phase 2 as being equal to phase 3, so it can very well occur that block 210 determines the current phase as phase 3. Then, the accumulation value is set equal to 1 in block 212 and the system operates in phase 3. If the phase is not equal to phase 3, the phase is set equal to phase 15 in block 214. Thus, at the end of phase 5, the program proceeds either to phase 3 or phase 15, depending upon the origin of the jog pump command.

Figure 5:
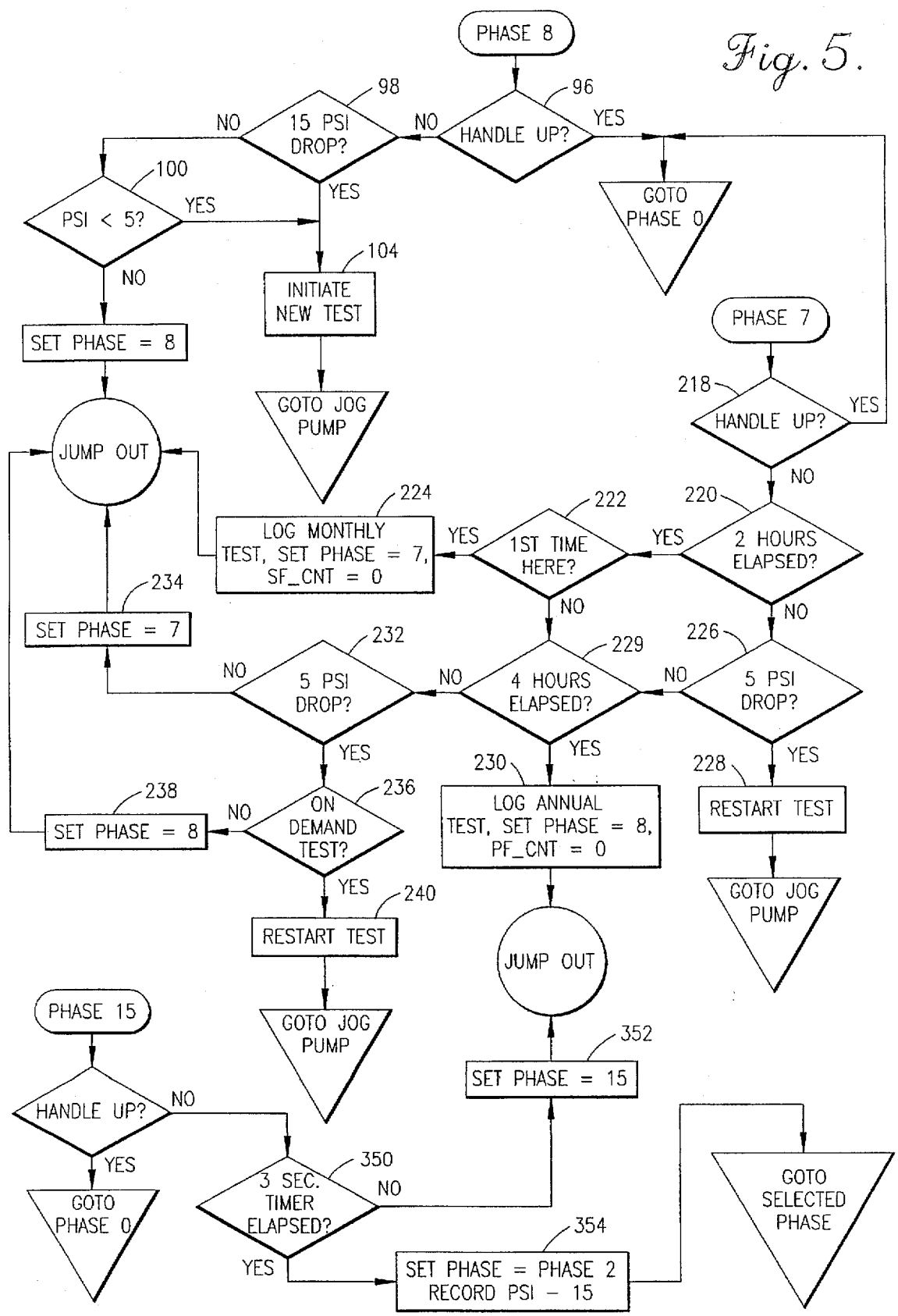

The routine of phase 7 is illustrated in FIG. 5. If block 218 determines that the handle is up, the program goes to phase 0. If it is not, block 220 is entered. Because phase 7 involves checking for leaks in the presence of thermal expansion, the time periods over which testing occurs are considerably greater than in other cases. Block 220 checks to see whether a time period of two hours has elapsed. If it has, block 222 is entered to determine whether the system has previously gone through this routine. If it has not, the system passes the monthly test, clears the monthly test fail counter, and continues looping through phase 7.

If a two hour time period has not elapsed, block 226 is entered from block 220 to determine whether the current pressure is less than the starting pressure recorded in block 150 minus 5 psi. If it is, block 228 is entered and a new test is initiated. If the pressure level has not dropped from the starting pressure level by 5 psi, block 229 is entered to determine whether a time period of four hours has elapsed. If it has, block 230 is entered and passing of an annual test of 0.1 gallons per hour is recorded. The annual test fail counter is cleared and the program advances to phase 8.

If a time period of four hours has not elapsed on the standard timer, block 232 is entered to again check for a pressure lower than the starting pressure minus 5 psi. If the condition in block 232 is not satisfied, the program continues to loop through phase 7. A check is made in block 232 as to whether the test is an "on demand" test (a test initiated by request). If it is not, the phase is set at 8 in block 238. If the test is an on demand test, block 240 is entered to restart the test.

Figure 6:
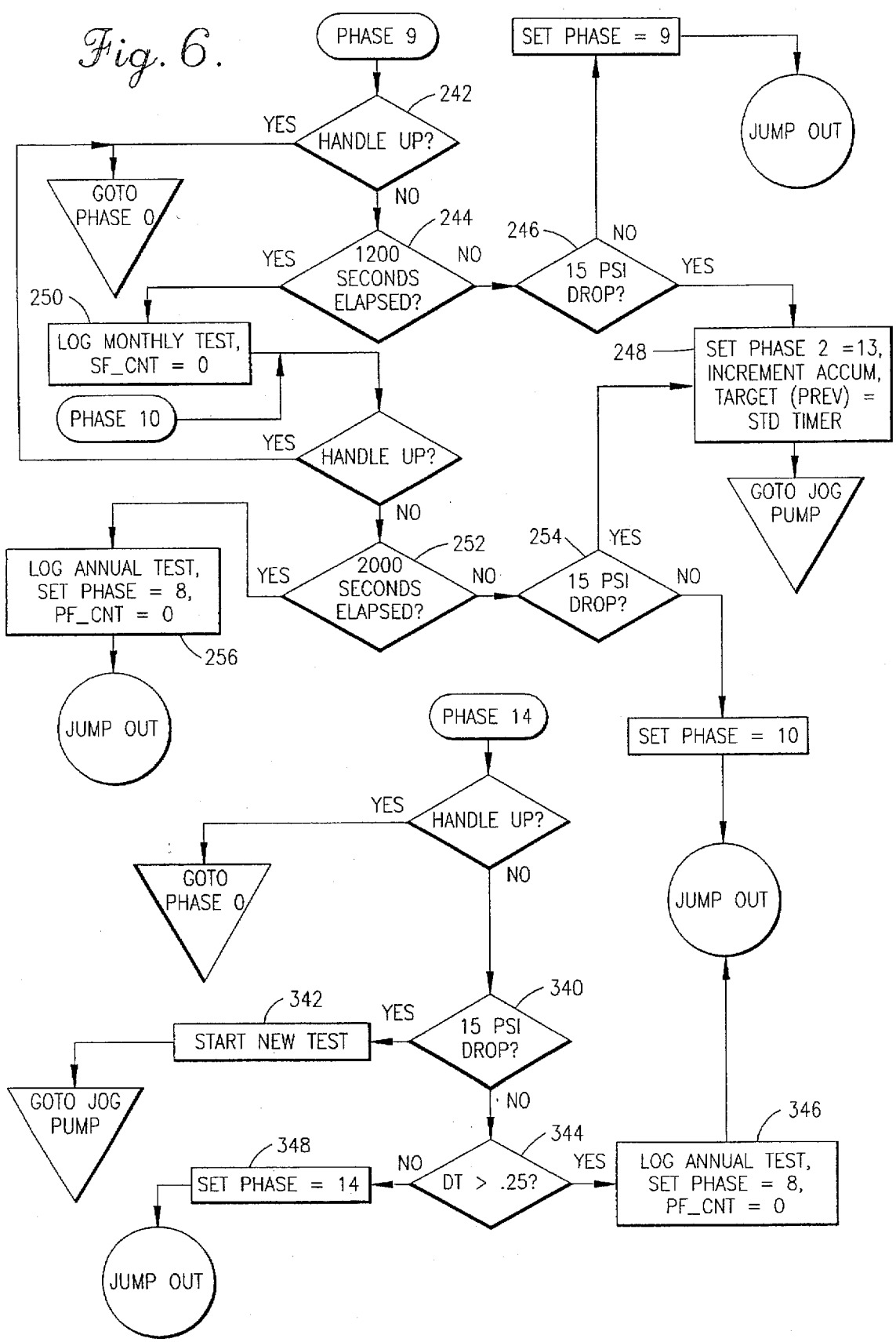

Operation of the system in phase 9 is depicted in FIG. 6. If the handle is not up, a determination is made in block 244 as to whether 1200 seconds have elapsed. If this time period has not elapsed, a determination is made in block 246 as to whether there has been a pressure drop of 15 psi. If there has not, the program loops through phase 9. If there has been a 15 psi pressure drop, block 248 records the time it took to fall 15 psi (decay cycle) as the target time, the accumulator (cycle counter) is incremented, the phase to continue testing in is set to 13 and the pump is then jogged to repressurize the line allowing another decay cycle to be observed.

If a time period of 1200 seconds has elapsed and there has not been a pressure drop of 15 psi, a monthly test is logged in block 250 and the system proceeds to phase 10 where the criteria for an annual test is evaluated.

In phase 10, block 252 is entered once it has been determined that the handle is not up. If it is determined in block 252 that a period of 2000 seconds has not elapsed, block 254 is entered to determine whether there has been a 15 psi pressure drop. If not, the program loops through phase 10. If there has been a 15 psi pressure drop, block 248 is entered and continues the test as described above. If 2000 seconds have elapsed without a pressure drop of 15 psi, an annual test is logged in block 256, the annual leak test fail counter is reset, and the system proceeds to phase 8 which is the waiting mode.

Figure 7:
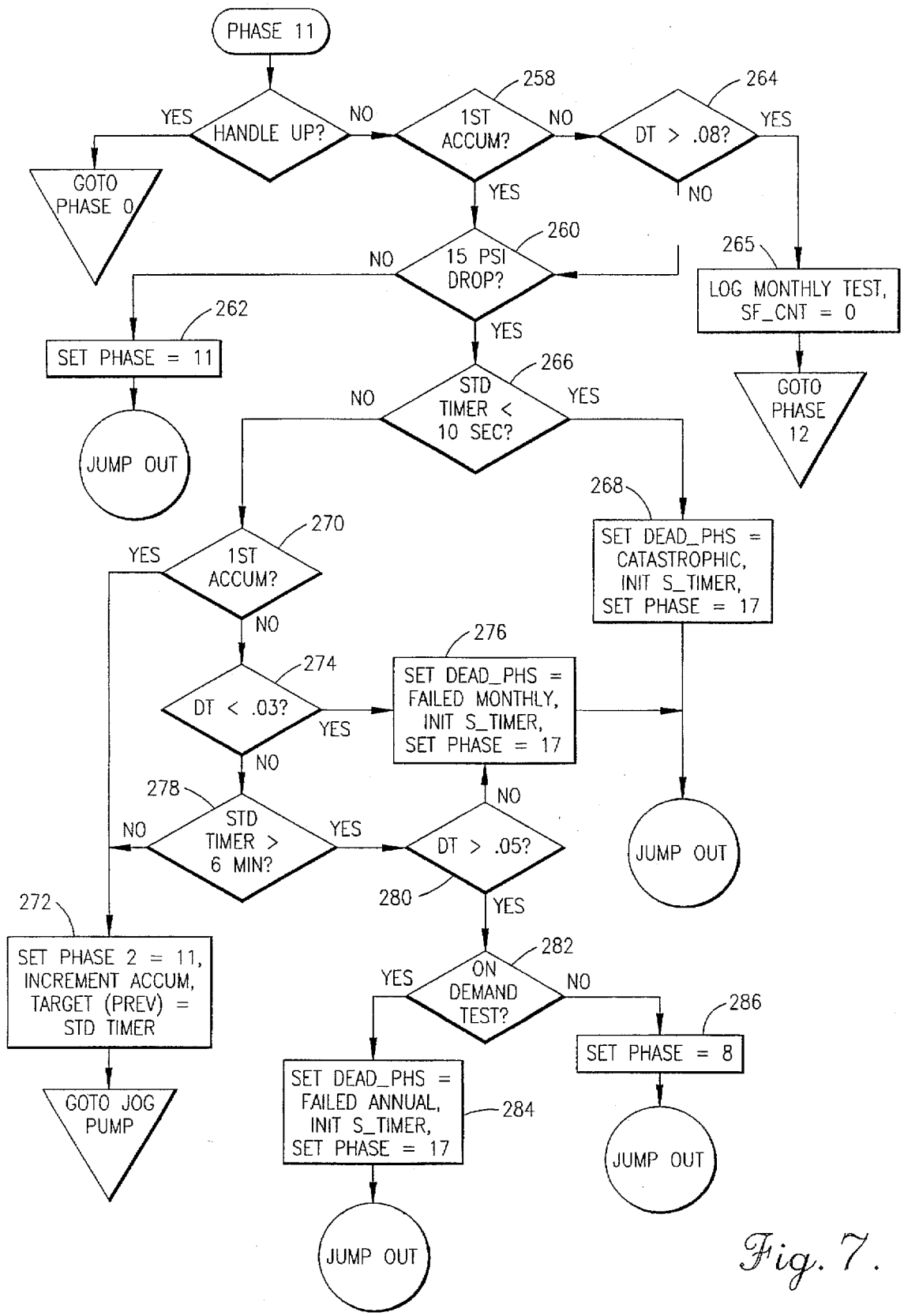

FIG. 7 depicts the routine of phase 11 which is carried out if an hourly test was not logged in phase 6. If an hourly test is not logged in phase 6, a 15 psi pressure decay took place in a relatively short period of time, less than 125 seconds. This relatively fast pressure decay can be the result either of a significant thermal contraction or a leak or both. Phase 11 attempts to determine whether it is due to a thermal contraction or to a leak.

If the pump handle is determined not to be up in phase 11, block 258 is entered to determine whether there has been a prior 15 psi pressure drop. If the pressure drop is the first, block 260 is entered to determine whether pressure has dropped 15 psi again. If it has not, program loops through phase 11.

While cycling through phase 11 with accumulator greater than 1, the standard timer, which is timing pressure decays, is constantly compared to the target timer, which is the time period recorded for the previous 15 psi drop. This provides an indication as to whether or not successive 15 psi pressure drops are requiring longer durations which indicate a thermal decay. If the current standard timer ever exceeds the target timer by 8% (defined as dt—delta time—in block 264) and pressure has not dropped 15 psi, criteria for a monthly test is satisfied and the test is logged per block 265. Upon logging any passed test, the fail counter for that type of test is reset. If the delta time has not reached 8%, phase 11 continues to check for a 15 psi drop in block 260.

If a determination is made in block 260 that there is a current 15 psi pressure drop, block 266 is entered to determine whether there has been an elapse of 10 seconds on the standard timer. If the time on the standard timer is less than 10 seconds, block 268 is entered to indicate that there is a suspected catastrophic leak and a failure to pass the hourly test. If the time elapsed on the standard timer is 10 seconds or greater, block 270 is entered to determine whether the current pressure drop is the first. If it is, block 272 is entered and the time it took to fall 15 psi is recorded as the target time, the accumulator (cycle counter) is incremented, the phase to continue testing in is set to 11 and the pump is then jogged to repressurize the line allowing another decay cycle to be observed.

If there has been a prior 15 psi pressure drop, block 274 is entered from block 270. In block 274, a check is made to determine whether the time period required for the most recent 15 psi pressure drop is less than 1.03 multiplied by the time required for the immediately preceding pressure drop of 15 psi. If the time periods for successive pressure drops are not increasing by at least this much, block 276 is entered to indicate a failed monthly test. The system then proceeds to phase 17 to perform secondary tests for false alarms caused by equipment failure or transient events. Block 278 is entered if the inquiry made in block 274 is answered negatively. Block 278 checks to see whether 6 minutes have elapsed on the standard timer. If not, block 272 is entered, and testing continues in phase 11. If so, then block 280 is entered and a check is made as to whether or not the most recent time period required for a 15 psi pressure drop exceeds 1.05 multiplied by the time period required for the immediately preceding pressure drop of 15 psi. If it does not, block 276 is entered to indicate a failed monthly test and phase 17 is again executed for secondary testing. Otherwise, block 282 is entered to check as to whether the current test is an "on demand" test (a test manually initiated at the service station). If it is an on demand test, block 284 is entered to indicate a failure of an annual test and again the system proceeds to phase 17 for secondary testing. If it is not a demand test, the phase is set to phase 8 in block 286 (the system is arranged to avoid indicating a failed annual test other than if it is an on demand test requested by the user).

Figure 9:
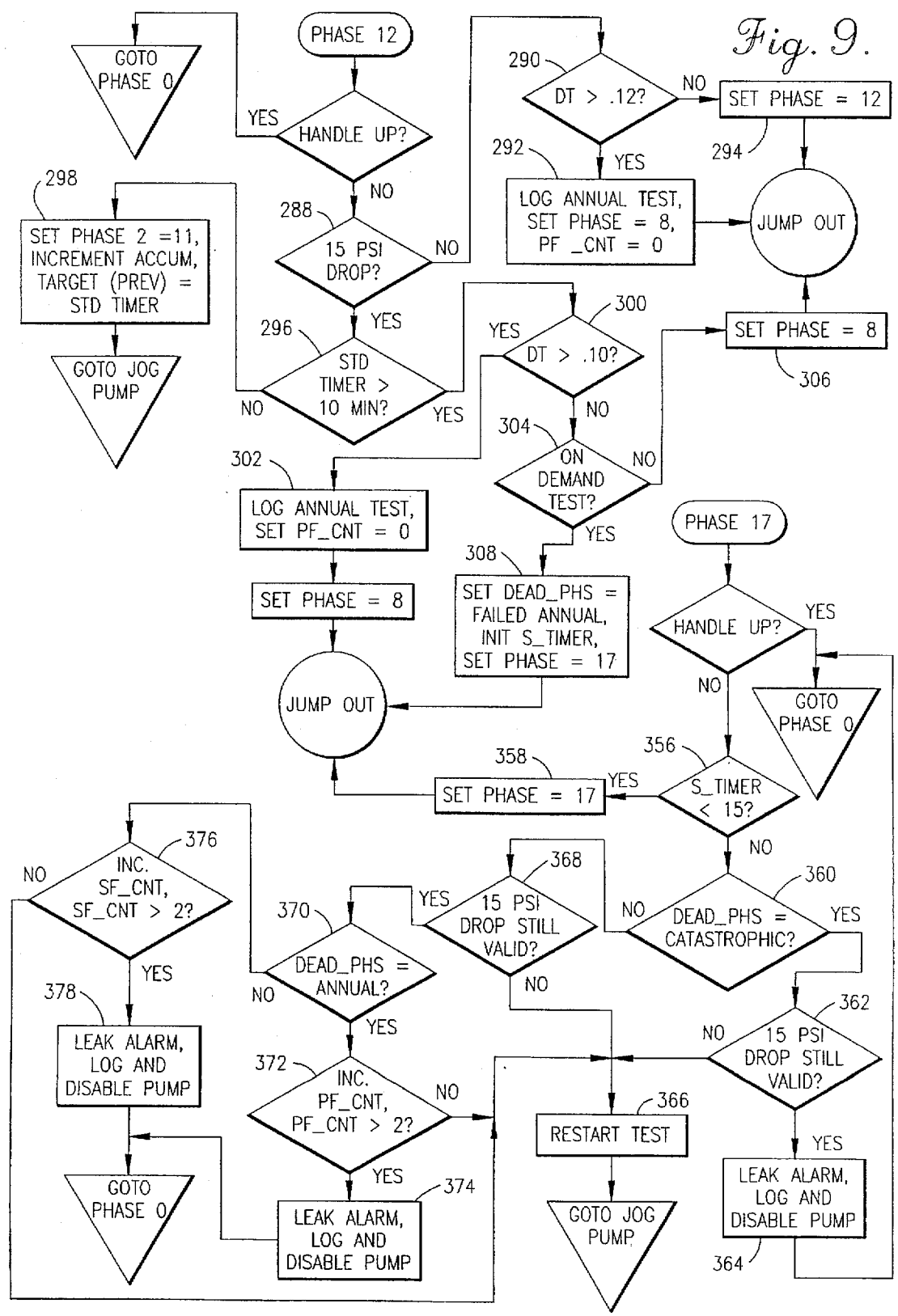

If a monthly test is successfully logged in phase 11, the system proceeds to phase 12 and pursues an annual test which is depicted in FIG. 9. After confirming that the handle is not up, a check is made for a 15 psi pressure drop in block 288. As long as there is no 15 psi drop the standard timer, which is timing pressure decays, is constantly compared to the target timer, which is the time period recorded for the previous 15 psi drop. This provides an indication as to whether or not successive 15 psi pressure drops are requiring longer durations which indicate a thermal decay. If the current standard timer ever exceeds the target timer by 12% (defined as dt—delta time—in block 290), criteria for an annual test is satisfied and the test is logged per block 292 and the system is directed to phase 8, a waiting mode. Upon logging any passed test, the fail counter for that type of test is reset. If the delta time has not reached 12%, phase 12 continues to check for a 15 psi drop in block 288.

If there has been a 15 psi pressure drop, block 296 is entered to check for an elapsed time of 10 minutes on the standard timer. If 10 minutes have not elapsed, block 298 is entered and the time it took to fall 15 psi is recorded as the target time, the accumulator (cycle counter) is incremented, the phase to continue testing in is set to phase 11 and the pump is then jogged to repressurize the line allowing another decay cycle to be observed. If a time period of 10 minutes has elapsed, block 300 is entered. There, a check is made as to whether the time required for the most recent 15 psi pressure drop exceeds 1.10 multiplied by the time required for the immediately preceding 15 psi pressure drop. If it does, an annual test is logged in block 302, the fail counter is reset and the system proceeds to phase 8. If it does not, block 304 is entered to check for an on demand test. If it is not an on demand test, the phase is set to 8 in block 306. If the test is an on demand test, block 308 is entered to indicate a failed annual test, and phase 17 is executed for secondary testing.

Figure 8:
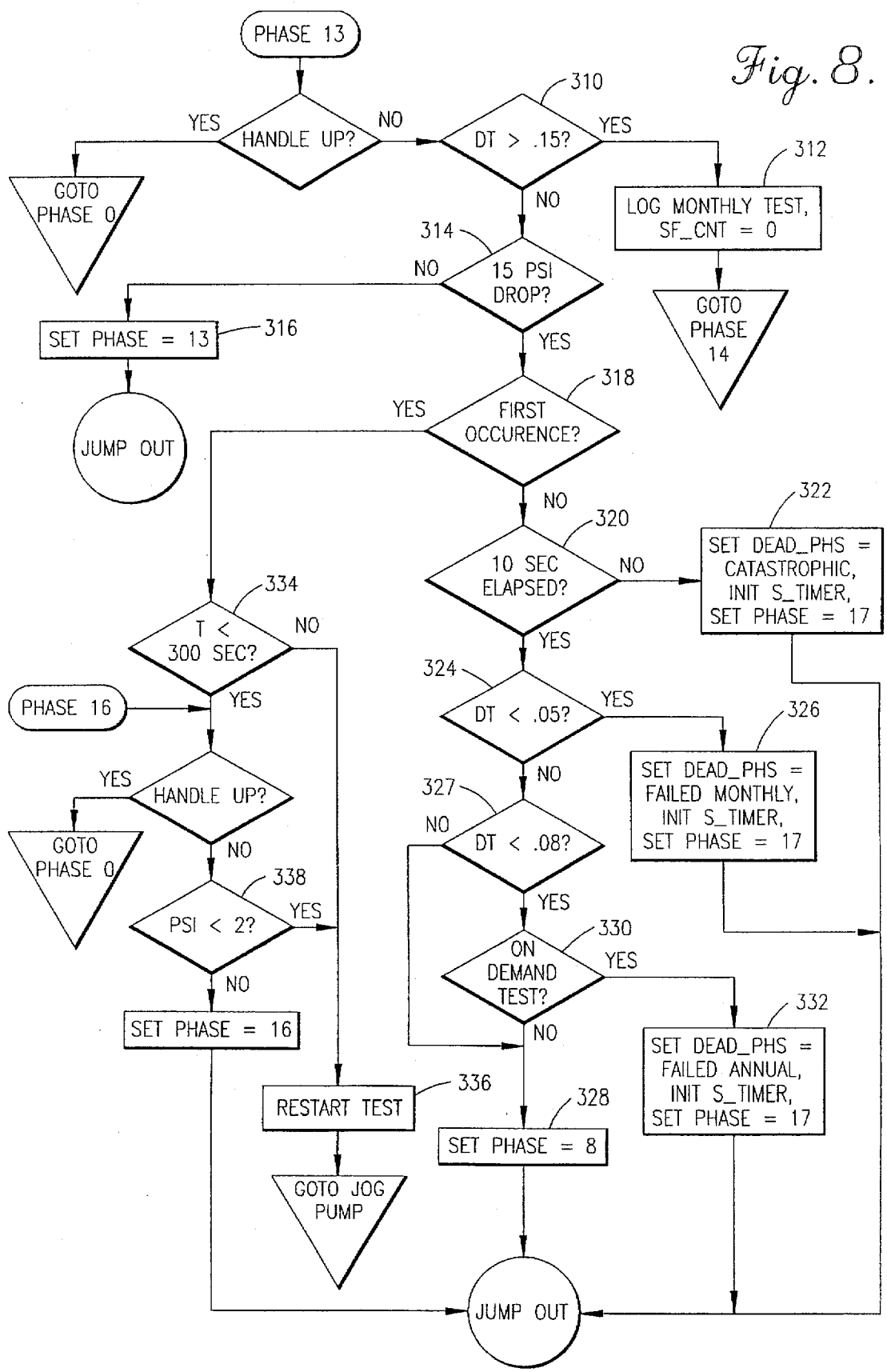

If there is a failure to pass the monthly test in phase 9 or a failure to pass the annual test in phase 10, the system proceeds to phase 13 which is depicted in FIG. 8. After a check is made to determine that the handle is down, block 310 is entered. There, the standard timer, which is timing pressure decays, is compared to the target timer, which is the time period recorded for the previous 15 psi drop. If the current standard timer ever exceeds the target timer by 15% (defined as dt—delta time—in block 310), criteria for a monthly test is satisfied and the test is logged per block 312, the fail counter is reset and the system is directed to phase 14 where an annual test is pursued. If the delta time has not reached 15%, phase 13 continues to check for a 15 psi drop in block 314. If there has been a 15 psi pressure drop, block 318 is entered and a check is made as to whether the pressure drop is the first one. If it is not, a check is made in block 320 as to whether the time elapse recorded on the standard timer is less than 10 seconds. If it is, block 322 is entered to indicate a failed hourly test and the system proceeds to phase 17 for secondary testing. If more than 10 seconds have elapsed on the standard timer, block 324 is entered. There, a check is made as to whether the time required for the most recent 15 psi pressure drop is less than 1.05 multiplied by the time required for the immediately preceding 15 psi pressure drop. If it is, block 326 is entered to indicate a failed monthly test and the system proceeds to phase 17 for secondary testing. If the answer to the inquiry made in block 324 is negative, block 327 is entered, and a check is made as to whether the time required for the most recent 15 psi pressure drop is less than 1.08 multiplied by the time required for the immediately preceding 15 psi pressure drop. If it is not, the phase is set equal to 8 in block 328. If it is, a check for an on demand test is made in block 330. If the test is not an on demand test, block 328 is entered from block 330. If it is an on demand test, block 332 is entered to indicate a failed annual test and the system proceeds to phase 17 for secondary testing.

If it is determined in block 318 that the pressure drop is the first occurrence, a check is made in block 334 as to whether the elapsed time period is less than 300 seconds. If it is not, block 336 is entered and the test is restarted. If the elapsed time period is less than 300 seconds, phase 16 allows the pressure to drop to 2 psi one time which is intended to permit some thermal energy to dissipate before the testing continues. The system remains in phase 16 until the psi is determined to be less than 2 in block 338. Then, block 336 is entered and the pump is jogged, and a new test is initiated.

Phase 14 is depicted in FIG. 6. It conducts an annual test following completion of a successful monthly test in phase 13. After it is determined that the handle is down, a check is made in block 340 as to whether there has been a 15 psi pressure drop. If there has been, that test is concluded and a new one is initiated. If there has not been a 15 psi pressure drop, a check is made in block 344 where the standard timer, which is timing pressure decays, is compared to the target timer, which is the time period recorded for the previous 15 psi drop. If the current standard timer ever exceeds the target timer by 25% (defined as dt—delta time—in block 344), criteria for an annual test is satisfied and the test is logged per block 346, the fail counter is reset and the system is directed to phase 8. If the delta time has not reached 25%, the system returns to phase 14 and continues to check for a 15 psi drop in block 340.

Phase 15 depicted in FIG. 5 effects a three second waiting period at the end of a pump jog operation before pressure readings are resumed. This provides time for the product line pressure to stabilize at the end of a pump jog. As shown in FIG. 5, phase 15 involves a check in block 350 as to whether the 3 second timer has elapsed. When the timer has elapsed, the predetermined 15 psi pressure drop is calculated by subtracting 15 from the current line pressure in block 354 and the phase is returned to the phase recorded before entering phase 15.

Phase 17 is depicted in FIG. 9 and is used to actually declare alarms and disable the pump after performing a series of secondary tests. After it has been determined the handle is down, a check is made in block 356 as to whether 15 seconds has elapsed since the alarm criteria was met. When 15 seconds has elapsed, a check is made in block 360 as to whether there has been a failed hourly test. If there has been a failed hourly test and the current pressure reading indicates that the original 15 psi drop is still valid in block 362, block 364 is entered to provide a leak alarm, log the alarm condition and disable the pump. If the 15 psi drop is not still valid, a faulty dispenser or transient pressure reading error is assumed and block 366 is entered and the test is restarted, timers are cleared and other parameters are initialized to begin a new test before proceeding to the jog pump routine.

If there has not been a failure of the hourly test, block 368 is entered from block 360, and a check is made to insure that the 15 psi pressure drop is still valid. If not valid, block 366 is entered from block 368 and a new test is started. A valid 15 psi pressure drop results in advancement to block 370 where a check is made for a failed annual test. If there has been a failed annual test, block 372 is entered for incrementing of the annual test fail counter and a check as to whether the fail counter has reached a value of 3. If it has not, block 366 is entered and a new test is started. If the fail counter has reached a value of 3, block 374 is entered to provide a leak alarm signal and to log the alarm condition and disable the pump.

If there has not been a failed annual test, block 376 is entered to increment the monthly test fail counter and check if the fail counter has reached a value of 3. If it has not, block 366 is entered and a new test is started. If the fail counter reaches a value of 3, block 378 is entered to provide a leak alarm signal and to log the alarm condition and disable the pump.

Summarizing the manner in which the leak detection system operates, phase 0 is the starting point and phase 1 activates the pump 18 and initiates the six hour "long pump run" timer unless the product line is in an alarm condition as a result of a leak declared from a previous test. In phase 2, checks are made for failure to pressurize the product line, failure to maintain pressure while pumping and for elapse of the six hour timer while dispensing occurs. If dispensing is not taking place, the pump is deactivated and the system advances to phase 3 and begins line testing.

In phase 3, checks are made for unduly high product line pressure (indicating a failed pressure sensor) and for an unduly low pressure (indicating a large leak or other serious problem). Under normal pressure conditions, the system advances from phase 3 to phase 6 where the line leakage testing actually begins.

Phase 6 involves checking both for a pressure increase (indicating thermal expansion) and for a 15 psi pressure drop (which can be due to a leak or to thermal contraction). If a pressure increase is detected indicative of thermal expansion, the system progresses to phase 7 where longer test times are used and smaller pressure drops are sensed in order to compensate for the thermal effects. If a pressure drop of 15 psi is not sensed within 125 seconds in phase 6, the hourly test is passed and the system advances to phase 9 for a monthly test. If there is a pressure drop of 15 psi in less than 10 seconds, the hourly test is failed. If there is a 15 psi pressure drop sensed in phase 6 within the time period of 10-125 seconds, the pump is jogged and the system moves to phase 11 where an attempt is made to determine whether the pressure drop is due to a thermal contraction or a leak.

The pump jog routine encompasses phases 4 and 5 and is used to activate the pump in order to recharge the product line pressure. In phase 4, a check is made to assure that the product line pressure is properly raised to at least 16 psi when the pump has been activated for 4 seconds. Phase 5 deactivates the pump following an additional one second delay. At the end of the pump jog operation, phase 5 directs the system to the proper phase which depends upon the origin of the pump jog command.

Phase 7 is the mode of leak detection used when a thermal expansion is present, as sensed in phase 6. In phase 7, a monthly test is passed unless there is a 5 psi pressure drop within 2 hours. An annual test is passed unless there is a 5 psi drop within 4 hours. If an annual test is logged, the system moves to phase 8 which is a waiting mode. No testing is carried out in phase 8. Instead, the system waits for a dispensing or a 15 psi pressure drop.

Phase 9 involves conducting a monthly test following a successful hourly test in phase 6. If a monthly test is passed in phase 9, (no 15 psi drop in 1200 seconds), the system advances to phase 10 to conduct an annual test. If the monthly test in phase 9 is not successfully completed, the pump is jogged and the system advances to phase 13 to continue to determine whether the pressure drop is caused by a leak or by thermal contraction. The system also goes to phase 13 if an annual test is not logged in phase 10.

Phase 11 involves testing in the event that it is unclear in phase 6 whether a pressure drop is due to a leak or to thermal contraction (or to both). In phase 11, the times between successive 15 psi pressure drops are compared to determine whether the time is increasing sufficiently to indicate that the pressure drop is due to thermal contraction. If the monthly test is logged in phase 11, the system advances to phase 12 where an annual test is then conducted.

The routine of phase 13 is carried out following either a failure to log a monthly test in phase 9 or a failure to log an annual test in phase 10. If a monthly test is passed in phase 13, the system proceeds to phase 14 for an annual test.

The actual declaring of alarms and disabling of the pump is performed in phase 17. Normally, three consecutive leak indications are required. However, a single failure of an hourly test indicating a large leak results in sounding of the alarm and disabling the pump.

Following a pump jog, the system is directed in phase 5 to resume operation in the proper phase which is determined by the source phase of the pump jog command.

Failure of an hourly test results in an immediate alarm signal and disabling of the pump, as there is a leakage rate of at least 3 gallons per hour that requires immediate attention. However, less severe leaks such as those involving failure to pass a monthly or annual test are not as important to address quickly, so the system requires three consecutive failures of these tests before an alarm is given. In this way, the system confirms that there actually is a leak and false alarms are avoided.

In the event that a leak is detected, a 15 second delay is effected in block 356 (FIG. 9) and the pressure is checked again to insure that the 15 psi drop is still valid, in either block 362 or block 368 before an alarm is given. This procedure assures that the indicated leak is not due to a transient aberration in the pressure or to some other transient condition that is not indicative of an actual leak. Unless the leak is confirmed following the 15 second delay, the system jogs the pump and reverts to the start of the test procedure.

It is an important feature of the invention that the system is arranged to always establish a 15 psi drop from the "relief" pressure (the pressure at which the product line stabilizes after the pump has been deactivated) before the possibility of a leak is explored (except for the case where a significant thermal expansion is present and a 5 psi drop is used in phase 7). The relief pressure can vary from cycle to cycle and can sometimes vary considerably after the system has been in service for a prolonged period. By keeping the pressure drop constant at 15 psi, the influence of varying relief pressures is negated. This feature, together with the relative high pressure levels that are involved, enhances the speed and reliability of the leak detection system. The pump normally operates at about 25–35 psi and the relief pressure is adjusted to be within 1 or 2 psi of pump pressure. Consequently, during the leak testing process, the product line pressure can range from mid 30's to low teens. Because a leak, especially a small one, is more easily discerned at a higher product line pressure, the use of higher pressures increases the ability of the system to detect leaks.

The operation of the system is based on the assumption that a pressure drop of 15 psi is due either to a leak or to thermal contraction, and that there is no significant thermal contraction occurring unless the pressure drops by 15 psi. Thus, the initial testing procedure in phase 6 simply checks for a 15 psi pressure drop within 125 seconds. If not, a successful hourly test is logged, it is assumed that there is no significant thermal contraction, and the system then attempts to log a successful monthly test in phase 9 (no 15 psi pressure drop in 1200 seconds) and a successful annual test in phase 10 (no 15 psi pressure drop in 2000 seconds).

A failure to pass an hourly test in phase 6, or a monthly test in phase 9, or an annual test in phase 10 results when there is a 15 psi pressure drop which could be caused by a leak or by thermal contraction. If the inconclusive test is an hourly test in phase 6, the system attempts to log a successful monthly test in phase 11 and a successful annual test in phase 12, both based on comparing the times required for successive 15 psi pressure drops which is used to distinguish between thermal contraction and leakage. When the inconclusive test is in either phase 9 or 10 (which follow a successful hourly test in phase 6), the system attempts to log a successful monthly test in phase 13 and a successful annual test in phase 14, both based on comparing the times required for successive 15 psi pressure drops in order to distinguish thermal contraction from leakage. Through this scheme, the absence of a pressure drop of 15 psi is the first factor checked and used to log successful tests. The presence of a 15 psi pressure drop results in the system distinguishing between leaks and thermal contractions by comparing the times needed for the pressure to drop by 15 psi in successive cycles. It is also to be noted that if the times for successive pressure drops are not increasing as they would under conditions of thermal contraction, the system interprets that situation as a leak.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. In a leak detection apparatus for a fuel product line through which fuel is pumped by a pump for dispensing, the improvement comprising:

means for sensing a preselected pressure in the product line that is approximately 15 psi below a relief pressure at which the product line is normally maintained when fuel is not being pumped therethrough;

means for declaring a passed hourly test if said preselected pressure in the product line is not sensed within a first time duration;

means for declaring a passed monthly test if said preselected pressure in the product line is not sensed within a second time duration longer than said first duration;

means for declaring a passed annual test if said preselected pressure in the product line is not sensed within a third time duration longer than said second duration;

means for sensing the presence of thermally induced expansion in the product line;

means for overriding all of said declaring means and effecting a thermal expansion test mode when thermally induced expansion is present;

means when in the thermal expansion test mode for declaring a passed monthly test if a predetermined pressure higher than said preselected pressure but below the relief pressure is not sensed within a fourth time duration longer than said second duration; and means when in the thermal expansion mode for declaring a passed annual test if a predetermined pressure higher than said preselected pressure but below the relief pressure is not sensed within a fifth time duration longer than said third duration.

2. The improvement of claim 1, including:

means for measuring a first time period required for the product line pressure to drop from the relief pressure to said preselected pressure;

means, after the product line pressure has been raised to the relief pressure again, for measuring a second time period required for the product line pressure to again drop from the relief pressure to said preselected pressure; and means, operative when said preselected pressure in the product line is sensed within said first time duration, for declaring a passed monthly test if said second time period exceeds said first time period by a preselected amount.

3. The improvement of claim 1, including:

means for measuring a first time period required for the product line pressure to drop from the relief pressure to said preselected pressure;

means, after the product line pressure has been raised to the relief pressure again, for measuring a second time period required for the product line pressure to again drop from the relief pressure to said preselected pressure; and means, operative when said preselected pressure in the product line is sensed within said first time duration, for declaring a passed annual test if said second time period exceeds said first time period by a preselected amount.

4. The improvement of claim 1, including:

means for measuring the time duration during which the pump has been continuously activated; and means for effecting an alarm condition when the pump has been continuously activated for more than a predetermined time period.

5. The improvement of claim 1, including:

means for declaring a failed hourly test under preselected pressure conditions in the product line;

means for effecting a time delay following declaring of a failed hourly test;

means for sensing said preselected pressure conditions a second time following expiration of said time delay; and means for effecting an alarm condition only if said preselected pressure conditions are sensed again a second time following expiration of said time delay.

6. The improvement of claim 1, including means for declaring a failed pressure sensing means upon sensing an unduly high pressure in the product line above a pre-established pressure.

7. The improvement of claim 6, including means for effecting a failed sensor alarm condition when a failed pressure sensing means is declared a selected number of times greater than one.

8. The improvement of claim 1, including:

means for activating the pump to increase the product line pressure to said relief pressure following sensing of said preselected pressure;

means for detecting the pressure in the product line a selected time after said pump has been activated; and means for declaring an empty product line source if the pressure in the product line is below a predetermined low value following expiration of said selected time following activation of said pump.

9. The improvement of claim 8, including means for effecting a dry source alarm condition when an empty product line source is declared a selected number of times greater than one.

10. In a pressure decay leak detection system for a fuel product line of the type that normally detects absence of leakage based on a preselected pressure drop in the product line not occurring during a predetermined time period, the improvement comprising:

means for sensing the presence of thermally induced expansion in the product line; and means, operative when thermally induced expansion is present in the product line, for declaring the absence of leakage if a selected pressure drop in the product line less than said preselected pressure drop does not occur during a selected time period greater than said predetermined time period.

* * * * *